Feb. 3. 1925.　　　　　　　　　　　　　　　1,525,346
A. J. WARREN
ADJUSTABLE SHUTTER
Filed June 8, 1923　　　　2 Sheets-Sheet 1

Andrew J. Warren
INVENTOR
BY Victor J. Evans
ATTORNEY

R. E. Wise.
WITNESS:

Feb. 3, 1925.
A. J. WARREN
ADJUSTABLE SHUTTER
Filed June 8, 1923 · 2 Sheets-Sheet 2
1,525,346
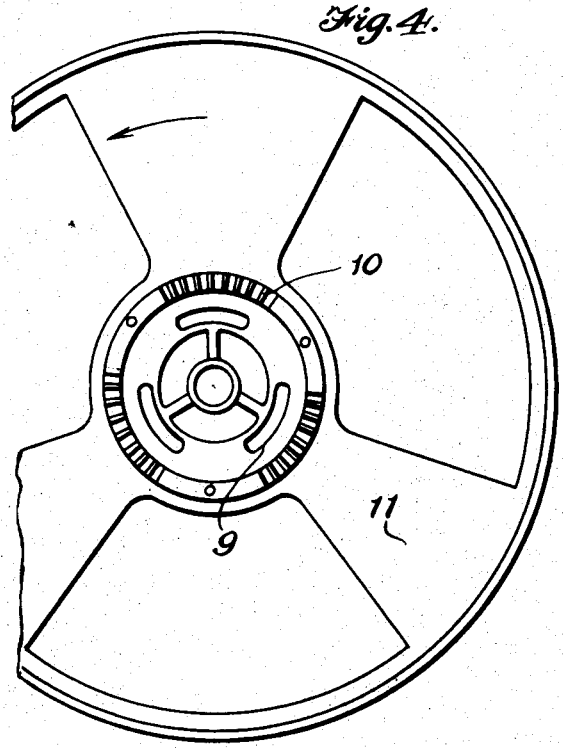
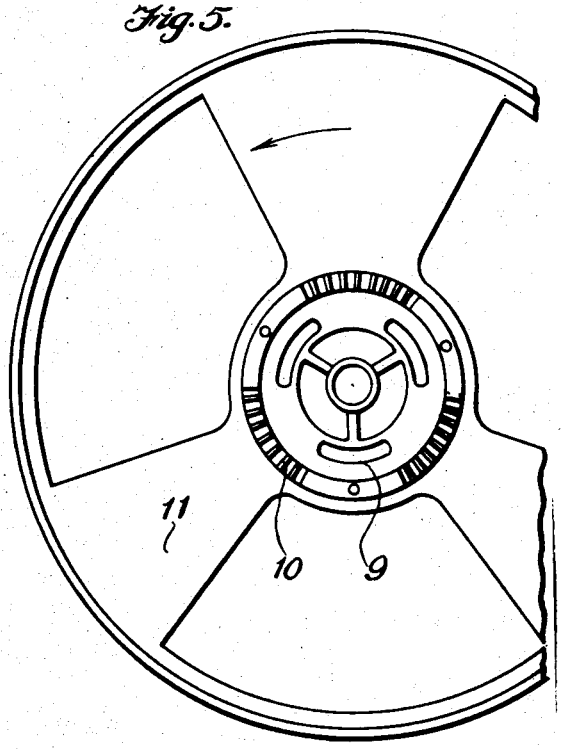
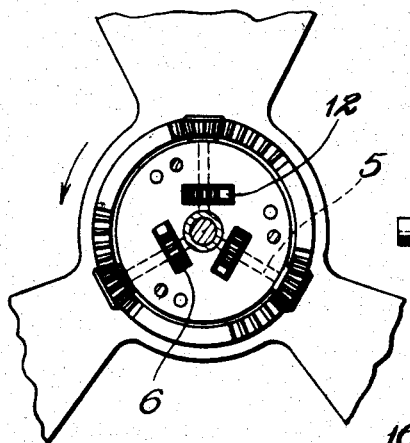
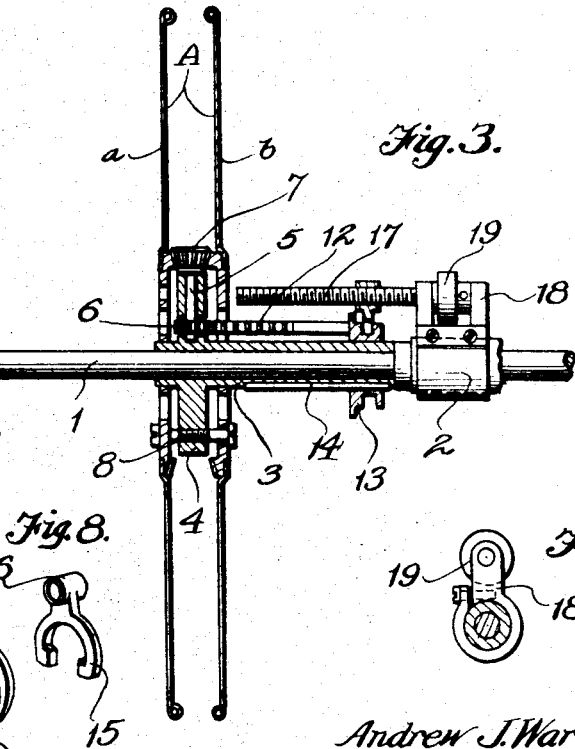
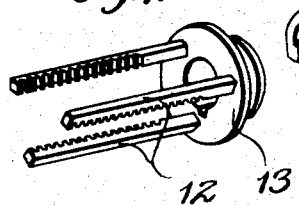
Andrew J. Warren
INVENTOR
BY Victor J. Evans
ATTORNEY Patented Feb. 3, 1925.

1,525,346

UNITED STATES PATENT OFFICE.

ANDREW J. WARREN, OF BEAUMONT, TEXAS.

ADJUSTABLE SHUTTER.

Application filed June 8, 1923. Serial No. 644,189.

*To all whom it may concern:*

Be it known that I, ANDREW J. WARREN, a citizen of the United States, residing at Beaumont, in the county of Jefferson and State of Texas, have invented new and useful Improvements in Adjustable Shutters, of which the following is a specification.

This invention relates to shutter mechanism for moving picture machines and the like, the general object of the invention being to adjust the openings in the shutter while the device is in motion.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a longitudinal sectional view.

Figure 4 is an inner face view of one shutter member.

Figure 5 is a similar view of the other member.

Figure 6 is a view of the hub member with one of the shutter members partially shown.

Figures 7 and 8 are prespective views of the rack bar carrying member and its operating fork.

Figure 9 is an end view of the support for the manually operated screw shaft.

Figure 1:
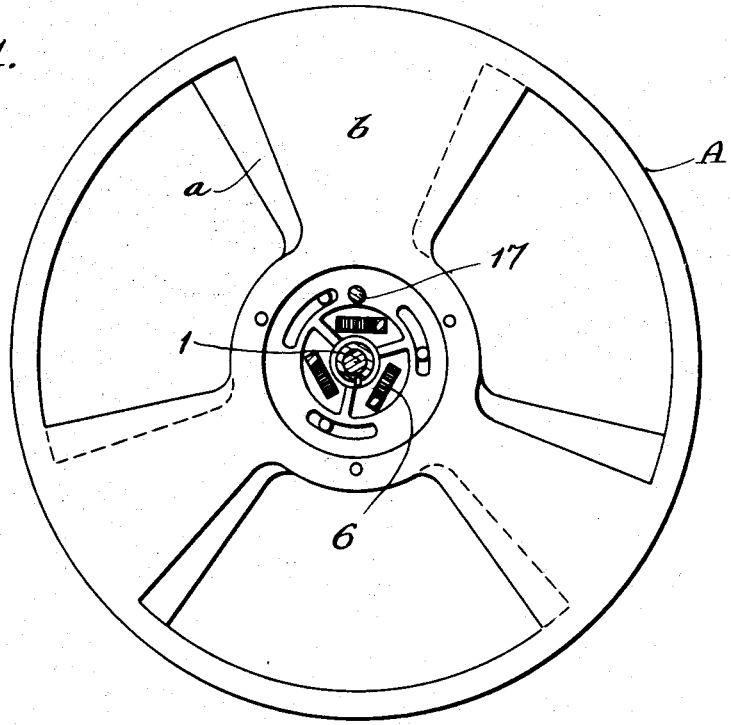
Figure 1 is a rear view of the improved shutter with the parts in one position.
Figure 2:
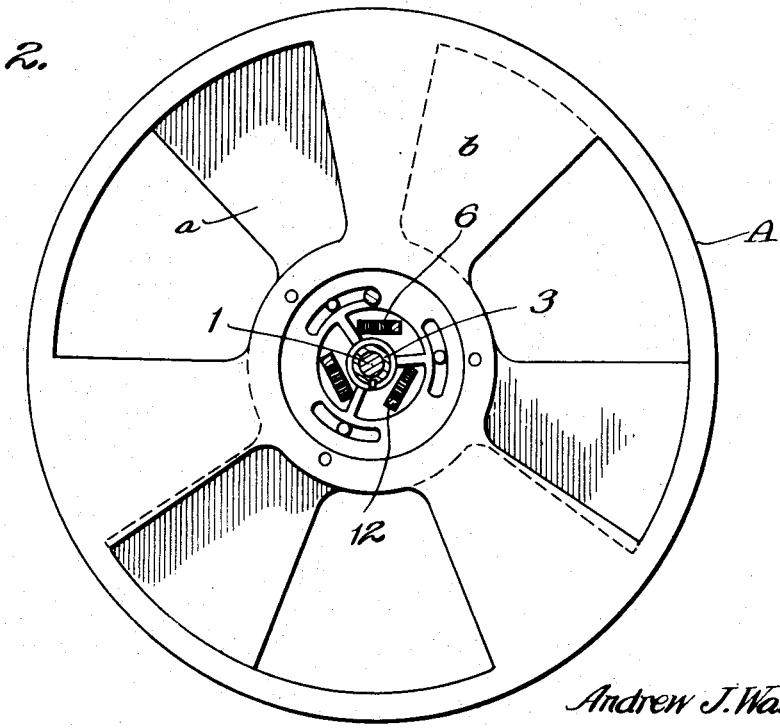
Figure 2 is a similar view with the parts in another position.

In these views 1 indicates the shaft of the machine to which the shutter is applied and 2 indicates one of the bearings for said shaft. A tubular shaft 3 is rotatably mounted on the shaft and said shaft 3 is provided with a hub 4 which carries a number of radiating stub shafts 5. The inner ends of these shafts have attached thereto the pinions 6 and the outer ends the beveled gears 7. The shutter A is composed of two parts *a* and *b* which are rotatably mounted on the tubular shaft 3, one on each side of the hub, and these shutter parts have their hubs movably attached to the hub 4 by means of the bolts 8 which pass through the arc-shaped slots 9 in the shutter parts. Each shutter part is provided with a mutilated ring gear 10, these gears being engaged by the bevel gears 7 so that when the stub shafts 5 are rotated one shutter part will be moved in one direction and the other part in an opposite direction, the slots 9 permitting this movement. Thus the openings in the shutter can be adjusted to various sizes as the solid portions 11 of the shutter parts are moved relative to each other so as to increase or decrease the openings.

The pinions 6 are engaged by the rack bars 12 and these rack bars are carried by the grooved collar 13 which is slidably but non-rotatably mounted on the tubular shaft 3 by means of the key 14. The groove in the collar is engaged by the fork 15 which has an interior threaded tubular part 16 which is engaged by the screw shaft 17. This screw shaft is mounted in a bracket 18 which is clamped to the bearing 2 and a disc 19 is fastened to the shaft between the parts of the bracket so that when the disc 19 is rotated by the fingers the shaft 17 will be rotated and thus the collar will be moved on the tubular shaft 3 and thus the rack bars will rotate the shafts 5 and thus cause the gears 7 to adjust the shutter parts by engaging the ring gears on said parts.

From the foregoing it will be seen that the shutter parts can be adjusted while the shutter is in motion. This device will reduce flicker to a minimum and at the same time keep the light at the screen at its maximum strength. It is easy to install and simple to operate.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a pair of shutter parts, mutilated ring gears thereon, a tubular shaft arranged on the shutter shaft, a hub on said tubular shaft, arranged between the shutter parts, stub shafts carried by the hub, a pinion and bevel gear on each stub shaft, the bevel gears meshing with the mutilated gears, rack bars engaging the pinions, a grooved collar to which the rack bars are connected, said collar being slidably mounted on the tubular shaft, a manually operated screw shaft and a fork actuated by the same and engaging the groove in the collar.

In testimony whereof I affix my signature.

ANDREW J. WARREN.